United States Patent
Oishi et al.

[11] Patent Number: 6,165,363
[45] Date of Patent: Dec. 26, 2000

[54] HOLLOW FIBER TYPE FILTRATION MEMBRANE

[75] Inventors: Teruhiko Oishi, Fuji, Japan; Hiroyoshi Ohya, Los Angeles, Calif.

[73] Assignee: Asahi Kasei Kogyo Kabushiki Kaisha, Osaka, Japan

[21] Appl. No.: 09/091,213

[22] PCT Filed: Dec. 17, 1996

[86] PCT No.: PCT/JP96/03677

§ 371 Date: Jun. 18, 1998

§ 102(e) Date: Jun. 18, 1998

[87] PCT Pub. No.: WO97/22405

PCT Pub. Date: Jun. 26, 1997

[30] Foreign Application Priority Data

Dec. 18, 1995 [JP] Japan .................................. 7-328872

[51] Int. Cl.⁷ ................................................ B01D 69/08
[52] U.S. Cl. ............................. 210/500.23; 210/500.27; 210/500.41; 264/41
[58] Field of Search ................... 210/500.23, 500.38, 210/500.41, 500.27, 500.42; 264/41, 176.1

[56] References Cited

U.S. PATENT DOCUMENTS

| | | | |
|---|---|---|---|
| 4,612,119 | 9/1986 | Eguchi | 210/500.23 |
| 4,774,039 | 9/1988 | Wrasidlo | 210/500.38 |
| 5,022,990 | 6/1991 | Doi et al. | 210/500.42 |
| 5,232,597 | 8/1993 | Eguchi | 210/500.23 |
| 5,354,470 | 10/1994 | Seita et al. | 210/500.23 |

FOREIGN PATENT DOCUMENTS

| | | |
|---|---|---|
| 0543355A2 | 5/1993 | European Pat. Off. . |
| 0572274B1 | 12/1993 | European Pat. Off. . |
| 59-228016 | 12/1984 | Japan . |
| 4-260424 | 9/1992 | Japan . |
| 5-76736 | 3/1993 | Japan . |
| 6-205954 | 7/1994 | Japan . |

*Primary Examiner*—Ana Fortuna
*Attorney, Agent, or Firm*—Birch, Stewart Kolasch & Birch, LLP

[57] ABSTRACT

A hollow fiber filter membrane where the inner surface comprises a three-dimensional network structure having thick trunks of 10–30 μm in maximum diameter and the average pore diameter of a minimum pore diameter layer of the membrane is 0.01 μm or more and less than 1 μm.

3 Claims, 2 Drawing Sheets

60 μm

HOLLOW FIBER TYPE FILTRATION MEMBRANE

This application claims the benefit under 35 U.S.C. §371 of prior PCT International Application No. PCT/JP96/03677 which has an International filing date of Dec. 17, 1996 which designated the United States of America, the entire contents of which are hereby incorporated by references.

TECHNICAL FIELD

The present invention relates to a hollow fiber filter membrane of anisotropic structure which is high in strength and excellent in water permeation performance.

BACKGROUND ART

Hollow fiber membranes are widely employed for industrial uses from microfiltration to ultrafiltration, and polyethylene, cellulose acetate, polysulfone, polyvinylidene fluoride, polycarbonate, polyacrylonitrile, etc. are used as materials for the membranes. Since conventional hollow fiber membranes made of these materials have been developed for the purpose of improving filtration performance, these hollow fiber membranes are low in breaking stress and breaking elongation and are apt to break due to abrupt changes in temperature and changes in pressure at back washing. Various attempts have been made for a solution to these problems, and there is suggested a method of increasing the density of a polymer in the whole hollow fiber membrane by increasing polymer concentration in a membrane-forming solution in the invention disclosed in JP-A-59-228016. However, according to this method, the strength of the membrane is improved, but the pore diameter of the membrane decreases and the water permeability of the membrane greatly decreases. Thus, hollow fiber membranes well-balanced in strength and water permeation performance have not yet been obtained.

On the other hand, a method of increasing the pore diameter of a membrane is generally employed for improving the water permeation performance of a membrane, but an increase in pore diameter generally causes a deterioration in the fractionation performance of the membrane and in the strength of the membrane.

As mentioned above, high-performance hollow fiber membranes well-balanced in strength, water permeation performance and fractionation performance have not been obtained by conventional techniques. For example, JP-A-4-260424 proposes a method for the production of membranes high in strength and excellent in water permeation performance, but membranes produced by this method have a large pore diameter and are not well balanced in water permeation performance and fractionation performance.

DISCLOSURE OF INVENTION

An object of the present invention is to provide a hollow fiber membrane having a high enough strength to withstand abrupt changes in temperature and changes in pressure at back washing and having well-balanced performances in water permeability and fractionation.

Another object of the present invention is to provide a method for producing a hollow fiber membrane high in strength and excellent in fractionation performance and water permeation performance.

The hollow fiber filter membrane of the present invention is characterized in that the inner surface of the membrane comprises a three-dimensional network having thick trunks having a maximum diameter of 10–30 $\mu$m, and the average pore diameter in a minimum pore diameter layer is 0.01 $\mu$m or more and less than 1 $\mu$m.

The method for producing the hollow fiber filter membrane of the present invention comprises discharging a membrane-forming solution comprising a membrane-forming polymer, a solvent for the polymer and specific additives from a double annular nozzle together with an inner solution comprising a high concentration aqueous solution of a good solvent for the polymer, passing the discharged solution through an air gap, and then coagulating the solution in a coagulating bath.

BEST MODE FOR CARRYING OUT THE INVENTION

Figure 1:
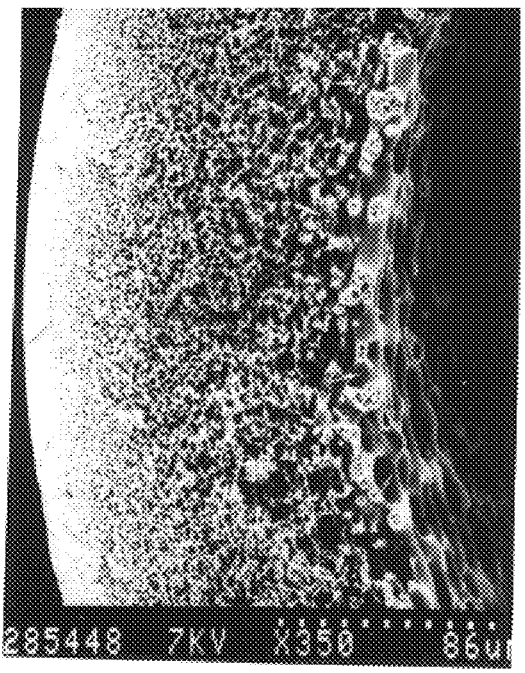
FIG. 1 is an electron micrograph (350×magnification) which shows a cross section of one embodiment of the hollow fiber filter membrane of the present invention.

A representative example of the structure of the hollow fiber filter membrane (hereinafter sometimes referred to as merely "membrane") of the present invention will be explained referring to the accompanying drawings. FIG. 1 is an enlarged photograph of cross section perpendicular to the lengthwise direction of the membrane, and FIG. 2 is an enlarged photograph of the inner surface of the membrane.

The membrane of the present invention has a shape of a hollow fiber having an inner surface and an outer surface, and comprises a network structure which integrally continues from one surface (e.g., the inner surface) to another surface (e.g., the outer surface) as shown in FIG. 1. The network structure in the membrane has no vacant portions of polymer such as a finger-shaped structure layer having cavities and a void layer.

The membrane of the present invention comprises a network structure having an anisotropy in pore diameter, such that the membrane has a layer having a minimum average pore diameter of pores present therein (hereinafter referred to as "minimum pore diameter layer") in the outer surface or near the outer surface and the pore diameter becomes gradually greater toward the inner surface of the membrane in the portion other than the minimum pore diameter layer. Therefore, the average pore diameter of pores present in the inner surface of the membrane (hereinafter referred to as "average pore diameter of inner surface") is greater than average pore diameter of pores present in the outer surface of the membrane (hereinafter referred to as "average pore diameter of outer surface").

Figure 2:
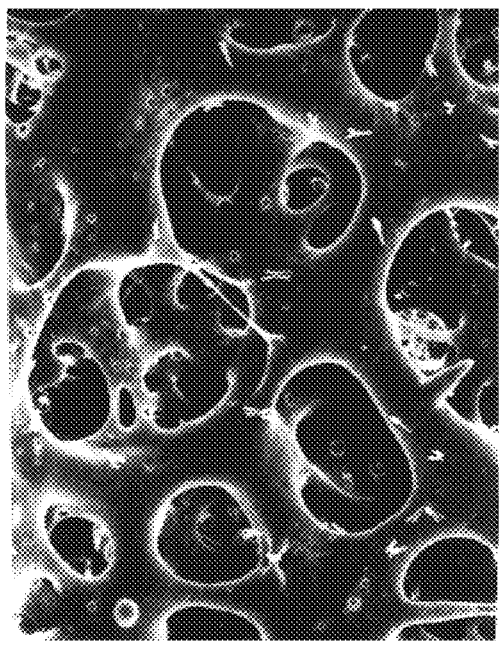
FIG. 2 is an electron micrograph (1,000×magnification) which shows the inner surface of the hollow fiber filter membrane shown in FIG. 1.

Pores having a circular cross-section and having nearly the same size open at the inner surface of the membrane as shown in FIG. 2. The average pore diameter of inner surface is 5–30 $\mu$m, preferably 15–30 $\mu$m. If the average pore diameter is less than 5 $\mu$m, filtration resistance of the membrane increases and causes deterioration in water permeation performance, and if it is more than 30 $\mu$m, the strength of the membrane decreases.

Figure 3:
FIG. 3 is an electron micrograph (5,000×magnification) which shows an enlarged section of the portion of thick trunk seen on the inner surface side of the hollow fiber filter membrane shown in FIG. 1.

The great characteristic of the present invention is that the inner surface comprises a three-dimensional network structure having thick trunks of 10–30 μm in maximum diameter. The term "trunk" here means a skeleton which forms a three-dimensionally continued network structure in the inner surface of the membrane of the present invention, and the term "thick trunk" means a trunk having a diameter of at least 10 μm. In the membrane of the present invention, thick trunks having a maximum diameter in the range of 10–30 μm are present in the inner surface or in the inner surface and near the inner surface. If the diameter of the thickest trunk is less than 10 μm, the strength of the resulting membrane is insufficient, and if it is more than 30 μm, water permeation performance of the membrane tends to deteriorate. The section of the trunk, especially of the thick trunk can be observed on the inner surface side (right side) of the section of the membrane, for example, in FIG. 1. Small pores are seen at the section of the thick trunk, and the section which is further enlarged is shown in the photograph of FIG. 3. In FIG. 3, the right side is the inner surface side and the left side is the outer surface side. It can be seen from FIG. 3 that the inside of the trunk has a reticulated porous structure, a so-called honeycomb structure. FIG. 2 shows that the trunks form a three-dimensional network structure.

A membrane having trunks of a honeycomb structure is higher in strength, though void content of the whole membrane is higher, than that of a membrane having no trunks of a honeycomb structure. The membrane of the present invention has a void content of 65–85% when the material of the membrane is polysulfone, and depending on the void content, the breaking stress is in the range of 40–90 kgf/cm$^2$ and the breaking elongation is in the range of 50–140%.

As mentioned above, the minimum pore diameter layer of the membrane is a layer present between the one surface and another surface of the membrane, in which the average pore diameter of pores is smallest, and this layer determines the fractionation performance of the membrane. The membrane of the present invention has a minimum pore diameter layer in the outer surface or near the outer surface, and the average pore diameter of pores present in the minimum pore diameter layer (hereinafter referred to as "average pore diameter of minimum pore diameter layer") is 0.01 μm or more and less than 1 μm. If the average pore diameter of the minimum pore diameter layer is less than 0.01 μm, the water permeation performance of the membrane tends to deteriorate, and if it is 1 μm or more, the performance for removal of fine particles tends to deteriorate. The preferred average pore diameter of the minimum pore diameter layer is 0.05 μm or more and less than 1 μm, and more preferred is 0.05 μm or more and 0.5 μm or less.

As materials which constitute the hollow fiber membrane of the present invention, mention may be made of, for example, polysulfone polymers, polyvinylidene fluoride polymers, polyacrylonitrile polymers, polymethacrylic acid polymers, polyamide polymers, polyimide polymers, polyether imide polymers, and cellulose acetate polymers. Especially preferred are aromatic polysulfones, polyacrylonitrile copolymers, polyvinylidene fluoride, and aromatic polyether imides. As the aromatic polysulfones, bisphenol A type polysulfone is especially preferred.

The membrane of the present invention has an excellent effect in that it exhibits a conspicuously greater water permeation than expected from the average pore diameter of the minimum pore diameter layer of membranes according to conventional techniques. Generally, in order to increase water permeation of a membrane, the average pore diameter of the minimum pore diameter layer must also be increased, and, hence, filter membranes which show the performances of a small fractionation molecular weight and great water permeation have not been obtained. On the other hand, the membrane of the present invention has a small average pore diameter for the minimum pore diameter layer of 0.01 μm or more and less than 1 μm, while showing a great water permeation of 500–100,000 liters/hr·m$^2$·atm (measured at 25° C.) with increases in the average pore diameter. Therefore, the membrane of the present invention is excellent in its balance of fractionation performance and water permeation performance.

A representative example of a method for the production of the hollow fiber membrane of the present invention will be explained.

The hollow fiber membrane of the present invention is produced by discharging a membrane-forming solution consisting essentially of a membrane-forming polymer, a solvent for the polymer and a specific additive from a double annular nozzle together with an inner solution comprising a high concentration aqueous solution of a good solvent for the polymer, passing the discharged solution through an air gap and then coagulating it in a coagulating bath.

The membrane-forming polymers used in the method of the present invention may be those which can form a membrane by a wet membrane forming method, and include, for example, polysulfone polymers, polyvinylidene fluoride polymers, polyacrylonitrile polymers, polymethacrylic acid polymers, polyamide polymers, polyimide polymers, polyether imide polymers, and cellulose acetate polymers. Aromatic polysulfones, polyacrylonitrile copolymers, polyvinylidene fluoride, aromatic polyether imides, etc. are particularly suitable for producing membranes having the above-mentioned structure. As aromatic polysulfones, bisphenol A type polysulfone is especially preferred.

The additive is preferably polyvinyl pyrrolidone. The membrane of the present invention can be obtained with difficulty by using other additives.

The solvents for the polymer include, for example, N-methyl-2-pyrrolidone, N,N-dimethylformamide, N,N-dimethylacetamide, etc. When the membrane-forming polymer is a bisphenol A type aromatic polysulfone, N-methyl-2-pyrrolidone is preferred.

The membrane-forming solution consists essentially of a membrane-forming polymer, a specific additive such as polyvinyl pyrrolidone and a solvent for the polymer. If other additives such as water and metal salts conventionally known as additives are added to the membrane-forming solution, the membrane of the present invention can be obtained with difficulty.

Polymer concentration of the membrane-forming solution used in the present invention is not especially limited as far as the concentration is in such a range that membrane formation from the solution is possible and the resulting membrane can perform as a membrane, and it is usually 10–35% by weight, preferably 10–30% by weight. In order to attain a high water permeation performance or a great fractionation molecular weight, the lower polymer concentration is preferred, and 10–25% by weight is preferred.

The amount of the additive (polyvinyl pyrrolidone) in the membrane-forming solution is 1–30% by weight, preferably 1–20% by weight, but the optimum concentration is determined depending on the molecular weight of polyvinyl pyrrolidone used. The weight-average molecular weight of the polyvinyl pyrrolidone is preferably 2,900–1,100,000, more preferably 2,900–110,000.

The inner solution is used for the formation of the hollow portion of the hollow fiber membrane and comprises a high concentration aqueous solution of a good solvent for the membrane-forming polymer. For example, when the membrane-forming polymer is a bisphenol A type aromatic polysulfone, the good solvent is selected from N-methyl-2-pyrrolidone, N,N-dimethylformamide, N,N-dimethylacetamide, etc.

The high concentration aqueous solution is preferably an aqueous solution containing 90% by weight or more of the good solvent. More preferably, it is an aqueous solution containing 93% by weight or more of the good solvent. If the content of the good solvent is less than 90% by weight, peeling tends to occur near the inner surface of the membrane.

The hollow fiber filter membrane of the present invention can be produced using known tube-in-orifice type double annular nozzles. More specifically, the above-mentioned membrane-forming solution and inner solution are simultaneously discharged from a double annular nozzle, passed through some air gap and then dipped in a coagulating bath to coagulate the solution. Thus, the hollow fiber membrane of the present invention can be obtained. The term "air gap" here means a space between the nozzle and the coagulating bath. The hollow fiber membrane can be produced in a more stable state when the air gap is surrounded by a cylinder and a gas having a given temperature and humidity is flowing through this air gap at a given flow rate.

As the coagulating bath, there may be used liquids which do not dissolve the polymer, for example, water; alcohols such as methanol and ethanol; ethers; aliphatic hydrocarbons such as n-hexane and n-heptane; and the like, and water is preferred. Furthermore, it is possible to control the coagulation rate by adding to the coagulating bath some quantity of a solvent which dissolves the polymer.

The temperature of the coagulating bath is $-30°$ C. $-90°$ C., preferably $0°$ C.$-90°$ C., more preferably $0°$ C.$-80°$ C. If the temperature is higher than $90°$ C. or lower than $-30°$ C., the surface state of the hollow fiber membrane in the coagulating bath is difficult to stabilize.

After formation of the membrane, polyvinyl pyrrolidone remaining in the membrane is removed by decomposing it with a decomposer.

Examples of the present invention will be shown below, but the present invention is not limited to these examples.

Methods for the measurement of properties are as follows:

The hollow fiber membranes used as samples for measurement are all in the state of being sufficiently impregnated with water. As for the membrane obtained by using polyvinyl pyrrolidone as an additive, the membrane was dipped in an aqueous sodium hypochlorite solution of 2,000 ppm for 4 hours and, then, washed with hot water at $80°$ C. for 20 hours to make a membrane in which substantially no polyvinyl pyrrolidone was present.

Water permeation of the hollow fiber membrane was expressed by the amount of filtered water (liter/hr·m$^2$·atm. measured at $25°$ C.) when ultrafiltration water of $25°$ C. was allowed to permeate through a sample of the hollow fiber membrane having a length of 50 mm from the inner surface to the outer surface. The effective membrane area was in terms of the inner surface in calculation of the water permeation.

The breaking stress and breaking elongation of the membrane were measured using a sample of 30 mm in length at a pulling rate of 50 mm/min by an Autograph AGS-5D manufactured by Shimazu Seisakusho, Ltd.

The breaking stress was obtained in the units of kgf/cm$^2$ by dividing the load per one hollow fiber membrane at breaking by the sectional area of the membrane before being pulled, and the breaking elongation (extension) was expressed by a ratio (%) of the elongated length before breaking to the original length.

The fractionation performance was measured in the following manner. A solution was prepared by suspending uniform latex particles having a particle size of 0.137 μm at a concentration of 0.02 vol % in a 0.2 wt % aqueous sodium dodecylsulfate solution. The resulting solution was filtered through the hollow fiber membrane at an average pressure difference of 0.5 kgf/cm$^2$ between inlet pressure and outlet pressure, and a stopping rate after 40 minutes was obtained.

The average pore diameter of the minimum pore diameter layer was measured by the air flow method specified in ASTM F316-86.

The void content of the membrane was measured in the following manner. A bundle of sufficiently dried hollow fiber membranes was cut to about 5 cm in length and the weight thereof was measured. This bundle was dipped in water for 30 minutes and thereafter excess water adhering to the hollow portion and outer surface of the membrane was removed. Then, the weight of water permeating the fine pores was obtained and the weight was converted into volume. Then, the volume ratio was obtained and the void content was calculated by the following equation.

$$\text{Void content (\%)} = \frac{\text{Volume of water permeating the fine pores}}{\text{Volume of the dried membrane}} \times 100$$

The size of the trunk was obtained from an electron micrograph of the section of membrane and the longest diameter of the section of trunk was employed as the size of the trunk.

The size of pores and trunks present in the inner surface of the membrane was obtained from an electron micrograph. The average pore diameter of the inner surface is shown by the following equation.

$$\overline{D} = \sqrt{\frac{(D_1^2)^2 + \ldots + (D_n^2)^2}{D_1^2 + \ldots + D_n^2}}$$

In the above equation, $\overline{D}$ denotes average pore diameter, $D_i$ denotes a measured diameter of the i th pore, and $D_n$ is a measured diameter of the n th pore. When the pore is close to circular, the measured diameters of $D_i$ and $D_n$ are expressed by the diameter thereof, and when the pore is not circular, they are expressed by the diameter of a circle having the same area as that of the pore.

EXAMPLE 1

(The Present Invention)

20% by weight of polysulfone (P-3500 manufactured by AMOCO Co., Ltd.) and 18% by weight of polyvinyl pyrrolidone (K30 manufactured by BASF Co., Ltd.) which had a weight-average molecular weight of 45,000 and for which the water content was adjusted to 0.3% by weight or less by drying were dissolved in 62% by weight of N-methyl-2-pyrrolidone to prepare a homogeneous solution. This solution was kept at $60°$ C. and discharged from a spinneret (a double annular nozzle 0.5 mm–0.7 mm–1.3 mm) together with an inner solution comprising a mixed solution of 95% by weight of N-methyl-2-pyrrolidone and 5% by weight of water, and the discharged solution was allowed to pass through an air gap of 60 mm and dipped in a coagulation bath comprising water at 70° C. In this case, the space between the spinneret and the coagulation bath was enclosed with a cylinder, and the humidity and temperature of the air gap in the cylinder were controlled at 100% and 45° C., respectively. The spinning speed was fixed at 20 m/min. Observation under an electron microscope showed that thick trunks having a reticulated porous inner structure were three-dimensionally linked on the inner surface of the resulting hollow fiber membrane and in the inner surface in up to a 20% depth of the membrane thickness. Structure and performances of the membrane are shown in Table 1. The void content of this membrane was 75%.

EXAMPLE 2

(The Present Invention)

A hollow fiber membrane was obtained in the same manner as in Example 1, except that polyether imide (Ultem 1010 manufactured by General Electric Co., Ltd.) was used as a membrane-forming polymer in place of the polysulfone used in Example 1. Structure and performances of the resulting hollow fiber membrane are shown in Table 1.

TABLE 1

|  | Example 1 (The present invention) | Example 2 (The present invention) |
|---|---|---|
| Inner diameter ($\mu$m) | 670 | 650 |
| Outer diameter ($\mu$m) | 970 | 920 |
| Water permeation (1/hr · m$^2$ · atm) | 12,000 | 9,600 |
| Fractionation performance (%) | 96 | 93 |
| Breaking stress (kgf/cm$^2$) | 65 | 64 |
| Breaking elongation (%) | 93 | 69 |
| Average pore diameter of minimum pore diameter layer ($\mu$m) | 0.27 | 0.30 |
| Average pore diameter of inner surface ($\mu$m) | 19 | 19 |
| Maximum diameter of thick trunks ($\mu$m) | 20 | 25 |
| Inner structure of thick trunks | Reticulated porous structure | Reticulated porous structure |

EXAMPLE 3

Comparative

A hollow fiber membrane was obtained in the same manner as in Example 1, except that a mixed solution of 60% by weight of N-methyl-2-pyrrolidone and 40% by weight of water was used as an inner solution. Structure and performances of the resulting hollow fiber membrane are shown in Table 2.

EXAMPLE 4

Comparative

A hollow fiber membrane was obtained in the same manner as in Example 1, except that N,N-dimethylacetamide was used as a solvent for the polymer in place of N-methyl-2-pyrrolidone and a mixed solution of 95% by weight of N,N-dimethylacetamide and 5% by weight of water was used as an inner solution. Structure and performances of the resulting hollow fiber membrane are shown in Table 2.

EXAMPLE 5

Comparative

A hollow fiber membrane was obtained in the same manner as in Example 1, except that polyethylene glycol (PEG 35000 manufactured by Merck Co., Ltd.) which had a weight-average molecular weight of 36,000 and of which the water content was adjusted to 0.3% by weight or less by drying was used as an additive in place of polyvinyl pyrrolidone used in Example 1. Structure and performances of the resulting hollow fiber membrane are shown in Table 2.

TABLE 2

|  | Example 3 (Comparative) | Example 4 (Comparative) | Example 5 (Comparative) |
|---|---|---|---|
| Inner diameter ($\mu$m) | 590 | 650 | 670 |
| Outer diameter ($\mu$m) | 990 | 960 | 940 |
| Water permeation (1/hr · m$^2$ · atm) | 170 | 3,000 | 1,900 |
| Fractionation performance (%) | 90 | 90 | 82 |
| Breaking stress (kgf/cm$^2$) | 42 | 42 | 40 |
| Breaking elongation (%) | 56 | 75 | 97 |
| Average pore diameter of minimum pore diameter layer ($\mu$m) | 0.28 | 0.30 | 0.39 |
| Average pore diameter of inner surface ($\mu$m) | 4 | 10 | 15 |
| Presence of thick trunks ($\mu$m) | not present | not present | not present |
| Maximum diameter of trunks ($\mu$m) | 1 | 5 | 2 |
| Inner structure of trunks | Having no reticulated porous structure | Having no reticulated porous structure | Having no reticulated porous structure |

EXAMPLE 6

Reference

The membrane-forming solution used in Example 1 was cast at a thickness of 150 $\mu$m on a glass plate, and the surface of the cast was exposed to an air flow of 100% relative humidity and 45° C. at a flow rate of 0.3 mn/sec for 5 seconds, and thereafter dipped in water at 70° C. to coagulate it, thereby obtaining a flat membrane. A section of the resulting membrane was observed by an electron microscope to find that the membrane had an anisotropic structure such that the surface of the casting which was exposed to the air flow was densest and gradually decreased in denseness towards another surface, but the membrane did not have thick trunks.

INDUSTRIAL APPLICABILITY

The membrane of the present invention has high strength and high water permeability in spite of the average pore diameter of the minimum pore diameter layer being small. Therefore, it is suitable for microfiltration, especially in the field of condensation treatment in nuclear power stations and thermal power stations, the field of removal of muddiness in tap water such as potable water and processing water, and the fields of fermentation and food.

What is claimed is:

1. A hollow fiber filter membrane wherein an inner surface thereof comprises a three-dimensional network structure having thick trunks of higher than 10 $\mu$m to 30 $\mu$m in maximum diameter; an average pore diameter of a minimum pore diameter layer of the membrane is not less than 0.01 $\mu$m and less than 1 μm; and the average pore diameter of the inner surface is higher than 5 μm but not more than 30 μm.

2. A hollow fiber filter membrane according to claim 1, wherein the average pore diameter of the inner surface is larger than that of an outer surface.

3. A hollow fiber filter membrane according to claim 1, wherein an inner part of the thick trunks has a reticulated porous structure.

* * * * *